United States Patent [19]

Doetsch et al.

[11] Patent Number: 4,596,702
[45] Date of Patent: Jun. 24, 1986

[54] POTASSIUM PERBORATE-HYDRATE AND PROCESS FOR ITS PREPARATION

[75] Inventors: Werner Doetsch, Bad Hoenningen; Rudolf Siegel, Neuwied, both of Fed. Rep. of Germany

[73] Assignee: Peroxid-Chemie GmbH, Hoellriegelskreuth, Fed. Rep. of Germany

[21] Appl. No.: 683,392

[22] Filed: Dec. 19, 1984

[30] Foreign Application Priority Data

Dec. 30, 1983 [DE] Fed. Rep. of Germany ....... 3347595

[51] Int. Cl.$^4$ .............................................. C01B 35/10
[52] U.S. Cl. .................................... 423/277; 423/276; 252/186.3
[58] Field of Search ....................... 423/276, 277, 279; 252/186.3

[56] References Cited

PUBLICATIONS

J. R. Partington et al., "Inorganic Per-Acids Part I, The Alkali Perborates", J. Chem. Soc. 1949, pp. 3420–3424.
Chemical Abstract 64175t, vol. 69, 1968, "Radicals in Sodium and Potassium Perborate".

*Primary Examiner*—John Doll
*Assistant Examiner*—Jackson Leeds
*Attorney, Agent, or Firm*—Schwartz, Jeffery, Schwaab, Mack, Blumenthal & Evans

[57] ABSTRACT

Disclosed is potassium perborate-hydrate of the formula $KBO_3 \cdot nH_2O$ where n is 0 to 1 and a process for its preparation by the reaction of $H_2O_2$ with potassium metaborate in the presence of an excess of potassium ions.

12 Claims, No Drawings

POTASSIUM PERBORATE-HYDRATE AND PROCESS FOR ITS PREPARATION

BACKGROUND OF THE INVENTION

The present invention concerns potassium perborate-hydrate and a process for its preparation.

The commercially available potassium perborate corresponds to the total formula of $KBO_3 \cdot H_2O_2$. This powder product is stable to a maximum of 80° C. only; above this temperature it decomposes and the process may even be explosive.

SUMMARY OF THE INVENTION

It is an object of the present invention to provide a thermally stable perborate and a process for its preparation.

These objects are achieved by the product and the process according to the present invention. The subject of the invention is a potassium perborate-hydrate (KPB) of the total formula of $KBO_3 \cdot nH_2O$, wherein n has a value of 0 to 1. Preferred values of n are the values 0 and 1 and values of 0.05 to 1, preferably 0.20 to 1, and particularly 0.50 to 0.95. These products are characterized by active oxygen contents of 13.8% (n=1) to 16.5% (n=0). A few, non-limiting examples of values for intermediate hydrate steps are 14.0%, 15.0% and 15.7% active oxygen.

A differential thermal analysis of the crystalline product according to the invention shows an endothermic peak (water cleavage) at 80° C.—except for the case of n=0—and an exothermic double peak (decomposition) at approximately 250° C. The KPB according to the invention thus has excellent thermal stability, achieved without the addition of special stabilizers.

The invention further comprises a novel process for the preparation of potassium perborate-monohydrate (KPB1). The process starts with the known reaction for producing potassium perborates by reacting hydrogen peroxide with potassium metaborate in the presence of water.

In accordance with the present invention, there has been provided a process for preparing potassium perborate-monohydrate by reacting hydrogen peroxide with potassium metaborate comprising the steps of (a) making a solution comprising hydrogen peroxide and potassium metaborate in a reacting zone whereby potassium perborate-monohydrate is produced, and wherein in the reacting zone the solution comprises a quantity of potassium ions exceeding the stoichiometric amount required for producing potassium perborate; (b) removing the potassium perborate-monohydrate from the reacting zone; (c) separating the potassium perborate-monohydrate from the solution; and (d) drying the potassium perborate-monohydrate.

Further objects, features and advantages of the present invention will become apparent from the following detailed description of preferred embodiments.

DESCRIPTION OF THE PREFERRED EMBODIMENTS

The reaction zone is defined as a spatial area in which the reactive components are brought into contact with each other. It may be designed as a reactor in the form of a vessel or a tube, for example.

In a preferred variant of the process, a concentration of hydrogen peroxide in the reaction zone—measured by the manganometric titration of the filtered mother liquor and calculated as 100% $H_2O_2$—of about 70 to about 150 g/l, preferably about 80 to about 110 g/l is provided.

In a further variant, a concentration of $B_2O_3$ (measured in the filtered mother liquor) of about 70 to about 180 g/l, preferably about 80 to about 120 g/l, is provided in the reaction zone.

Hydrogen peroxide and the metaborate are used in approximately stoichiometric quantities. A preferred variant provides for a slight excess in metaborate, which may amount up to about 35 mole %, preferably up to about 25 mole %, as measured in the mother liquor.

According to the stoichiometry of the reaction, hydrogen peroxide and potassium ions should be used in a mole ratio of 1:1. However, the process according to the invention provides for the addition of an amount of potassium ions in excess of this ratio. The excess of potassium ions in the reaction zone is adjusted advantageously from about 30 mole % to about 400 mole %, preferably from about 50 mole % to about 200 mole %, with respect to the stoichiometrically required quantity of potassium ions. It has been found particularly advantageous to add this excess, at least in part, in the form of another potassium salt soluble in the reaction mixture and not in the form of potassium metaborate. The other potassium salt may be added both separately and together with the metaborate and/or hydrogen peroxide solution to the measured in. Preferred potassium salts are potassium sulfate and/or potassium chloride.

Even though the addition of specific active oxygen stabilizers is not necessary to obtain an excellent dry stability, known stabilizers, such as silicates, phosphates, phosphonic acids, organic complex formers, etc., may be added.

The temperature in the reaction zone varies within the usual range for the preparation of perborates and is typically from about 0° C. to about 30° C., preferably from about 0° C. to about 20° C.

The reaction is preferably conducted with stirring or mixing in a known manner. The reaction may be discontinuous or continuous. Thus, a particular variant provides for a continuous process, comprising a continuous, metered addition to the reaction zone (corresponding to the removal according to step (b)), of the following: hydrogen peroxide, a potassium metaborate solution, a soluble potassium salt (if necessary), and at least a part of the mother liquor obtained in Step (b).

It is known in the art that KPB1 nuclei may be added to the reaction zone from an earlier mixture, in order to optionally accelerate the start of the precipitation.

The retention time in the reaction zone may be varied as needed. In order to form coarse, abrasion resistant crystals, average retention times of from about 0.5 to about 4 hours, preferably from about 1 to about 3 hours, are advantageous. In this manner, crystals with a very narrow grain size spectrum are obtained. In a typical yield of KBP1, about 80% by weight, preferably about 90% by weight, are within a grain size range of from about 0.053 to about 0.42 mm. These values are also valid for further dehydrated KPB.

The crystals are processed in a known manner by means of separation processes, such as filtration or centrifugation and the subsequent drying of the wet crystals for example. For this purpose, known driers, such as fluidized bed dryers, for example, may be employed. It is essential here to keep the temperature of the material below a temperature which causes dehydration of the KPB1, if the monohydrate is intended to be produced. To prepare the hydrate forms $KBO_3.nH_2O$, wherein n is smaller than 1, the KPB1 is treated at material temperatures above the temperature effecting dehydration.

The process according to the invention is novel and inventive. Thus, it is surprising, particularly when compared to the preparation of sodium perforate-monohydrate, that the monohydrate of the potassium salt may be obtained directly by crystallization. It is not necessary, as in the case of preparing the sodium salt, to initially crystalline a tetrahydrate, which must then be dehydrated in a subsequent, additional step.

The following examples are to describe the invention in more detail, without limiting its scope. Percentages are by weight.

EXAMPLE 1

Preparation of a Master Solution 280 ml $H_2O_2$ (54% of weight, to which 250 g KCl/l are added) are added to 1.5 l of a potassium metaborate solution (253.4 g/l KOH, 216.6 g/l $B_2O_3$, 151 g/l KCl) with stirring, and the master solution is cooled to 2° C.

EXAMPLE 2

Precipitation of Potassium Perborate-monohydrate and Processing

Following a 45 minute period of stirring, a potassium metaborate solution (253.4 g/l KOH, 216.6 g/l $B_2O_3$, 151 g/l KCl) and a hydrogen peroxide solution (54% by weight, to which 250 g KCl/l had been added) are added continuously to the master solution prepared according to Example 1, while the temperature is held at 2°–4° C. Simultaneously, the reaction mixture is continuously drawn off at a rate corresponding to the input. The input and output are correlated with each other in a manner such that an $H_2O_2$ concentration of 96 g/l and a $B_2O_3$ concentration of 113 g/l are obtained in the filtered mother liquor.

The crystals obtained are separated from the mother liquor by filtration and dried in a fluidized bed dryer at an exhaust air temperature of 30° C.

The mother liquor obtained is reused for the preparation of the potassium metaborate solution.

The potassium perborate produced displays the following analysis:

| | |
|---|---|
| Active oxygen content | 13.7% |
| Bulk density | 0.94 kg/l |
| Grain size analysis | |
| coarser than 0.84 mm | 0.0% |
| 0.84–0.42 mm | 5.8% |
| 0.42–0.149 mm | 83.2% |
| 0.149–0.053 mm | 11.0% |
| smaller than 0.053 mm | 0.0% |

EXAMPLE 3

The KPB1 produced in Example 2 was dehydrated further in a fluidized bed dryer at an exhaust air temperature of 40° C. A KPB with an active oxygen content of 15.0% was produced.

EXAMPLE 4

The KPB1 produced in Example 2 was dehydrated further in a fluidized bed dryer at an exhaust temperature of 60° C. A KPB with an active oxygen content of 15.7% was produced.

What is claimed is:

1. A process for preparing potassium perborate-monohydrate by reacting hydrogen peroxide with potassium metaborate comprising the steps of:
   (a) forming a solution comprising hydrogen peroxide and potassium metaborate in a reaction zone, wherein the temperature of said solution is maintained at between about 0° and about 30° C., whereby potassium perborate-monohydrate is produced, and wherein in said reacting zone said solution comprises a quantity of potassium ions exceeding the stoichiometric amount required for producing potassium perborate-monohydrate;
   (b) running potassium perborate-monohydrate from said reaction zone;
   (c) separating the potassium perborate-monohydrate; and
   (d) drying the potassium perborate-monohydrate.

2. A process according to claim 1, wherein the hydrogen peroxide concentration of the solution in said reaction zone comprises from about 80 g/l to about 110 g/l.

3. A process according to claim 1, wherein said quantity of potassium ions comprises from about 50 mol% to about 200% greater than said stoichiometrically required amount.

4. A process according to claim 1, wherein in said reaction zone, said solution further comprises $B_2O_3$, present in a concentration from about 80 g/l to about 120 g/l.

5. A process according to claim 1, wherein in said reaction zone, said solution further comprises a potassium salt soluble in said solution.

6. A process according to claim 5, wherein said potassium salt is selected from the group consisting of potassium sulfate and potassium chloride.

7. A process according to claim 1, wherein the temperature of the solution in said reaction zone comprises from about 0° C. to about 20° C.

8. A process according to claim 1, wherein said potassium perborate-monohydrate is removed from said reaction zone after a reaction period of from about 1 to about 3 hours.

9. A process according to claim 1, wherein said step of removing comprises continuously removing, and wherein said step of forming said solution comprises continuously adding hydrogen peroxide, potassium metaborate, a potassium salt and a quantity of recycled solution obtained in said removing step at a rate which corresponds to the rate of said removing step.

10. Potassium perborate monohydrate corresponding to the formula $KBO_3.1H_2O$.

11. Potassium perborate monohydrate of the formula $KBO_3.1H_2O$ produced in accordance with the process of claim 1.

12. A process for the preparation of potassium perborate of the formula $$KBO_3.nH_2O$$

wherein n is less than 1, comprising the step of dehydrating potassium perborate monohydrate.

* * * * *